DIGIT LINE SELECTION MATRIX

Filed Feb. 2, 1967 2 Sheets-Sheet 1

Milton G. Bienhoff,
Alfred W. Sanborn,
Michael Sherman,
INVENTORS.
BY.
[signature]
ATTORNEY.

March 10, 1970 M. G. BIENHOFF ET AL 3,500,358

DIGIT LINE SELECTION MATRIX

Filed Feb. 2, 1967 2 Sheets-Sheet 2

Milton G. Bienhoff,
Alfred W. Sanborn,
Michael Sherman,
INVENTORS.

BY.

Joseph Dwyer

ATTORNEY.

United States Patent Office 3,500,358
Patented Mar. 10, 1970

3,500,358

DIGIT LINE SELECTION MATRIX

Milton G. Bienhoff and Alfred W. Sanborn, Canoga Park, and Michael Sherman, Granada Hills, Calif., assignors to Singer-General Precision, Inc., a corporation of Delaware Filed Feb. 2, 1967, Ser. No. 613,637
Int. Cl. G11b 5/00
U.S. Cl. 340—174 7 Claims

ABSTRACT OF THE DISCLOSURE

A transformer matrix for selecting one of a plurality of magnetically plated digit lines in a woven wire memory in which each digit line contains a plurality of magnetizable zones for the storage of such binary data as is used by digital computer memories. Each transformer, when appropriately selected by matrix selection techniques, provides to its associated digit line a magnetizing current of a selected polarity, as well as providing an output device to a single output transformer and read amplifier, which are common to all digit lines.

BACKGROUND OF THE INVENTION

One of the most promising recent developments in digital computer memories is the woven wire magnetic memory matrix. The advantages of this device are that it is very small, light weight, reliable even in an environment of high radiation and, because it may be manufactured by loom weaving techniques, it is relatively inexpensive. Resembling a fine mesh wire screen, the woven wire memory matrix is comprised of insulated conductive wires woven at right angles to magnetically coated electrical conductors. The magnetic coating is an anisotropic magnetic film plated on the electrical conductor in the presence of a circumferentially oriented magnetic field so that there is an easy direction of magnetism in a circumferential ring around the conductor and a hard direction of magnetism running axially, or longitudinally, of the conductor. These magnetically coated electrical conductors will be hereinafter referred to as "digit lines" and the insulated electrical conductors woven at right angles to the digit lines will be hereinafter referred to as "word lines."

When it is desired to write a binary bit of magnetic information into a portion of the digit lines, a current is first applied through the appropriate word lines. This generates a longitudinal magnetic field which tends to rotate magnetic domains at the intersection of that word line and digit line from its easy, or circumferential direction of magnetization toward the longitudinal, or hard direction. The magnetization is thus "sensitized" so that the application of a current of a selected polarity through the digit line will tilt the magnetization away from the hard direction toward the particular easy direction determined by the polarity of the digit line current. Two binary storage states therefore exist: magnetic domains lying in a first easy, or circumferential direction may designate a binary ZERO; a binary ONE may be represented by domains being rotated in the opposite easy direction. The binary information is thus stored in accordance with the particular direction the magnetic domains lie in the easy axis of magnetization.

The memory matrix may be interrogated by pulsing the word lines. Besides serving as a storage medium and a digit line, the magnetically plated conductor also functions as a sense line. The pulsing of the word line generates a longitudinal magnetic field and rotates the magnetic domains toward the hard direction of magnetization, thus establishing a flux rotation which induces a voltage in the digit line. The particular state of the binary information that was stored is determined by the polarity of this sense voltage, which depends upon whether the original easy axis of magnetization was clockwise or counterclockwise.

In a memory matrix many digit lines are utilized and each digit line contains many word lines and magnetic storage zones. A major problem with respect to large scale digital memories is the selection of that portion of the memory into which the data is to be written, and from which the data is to be read. Heretofore, the selection has been accomplished by transistor switching circuitry which, while sufficiently fast, simple and inexpensive in very small systems, is extremely complex and employs large numbers of power dissipating components in large systems. Furthermore, a large number of critically balanced components are generally required to provide a reasonable degree of reliability.

The invention obviates the difficulties encountered in the prior schemes and provides a simple and efficient digit line selection system which not only supplies a digit line current of a selected polarity for the recording of binary information, but also detects the output signal from an interrogated digit line and transmits that signal to the input terminals of a read amplifier.

Accordingly, it is an object of the invention to provide a novel selection circuit for supplying "write" pulses to a selected digit line of a plated wire memory matrix.

It is another object of the invention to provide a digit line selection matrix which supplies high level "write" signals to selected digit lines of a memory matrix and permits low level "read" sense signals to be transmitted to a read amplifier for supplying information to a digital computer.

It is a further object of the invention to provide a digit line selection matrix circuit with a minimum number of components.

It is still another object of the present invention to provide a digit line selection matrix circuit without critical balancing of components.

SUMMARY OF THE INVENTION

The present invention includes a matrix consisting of a plurality of $(m \times n)$ transformers, one for each digit line. Each of the transformers includes a center tap on its primary winding (primary), and one end of each primary is connected to a first unipolar terminal while the other end is connected to a second unipolar terminal. One half of the primary is driven by a current having a polarity representing a binary "1," while the other half is driven by a current having a polarity representing a "0." Means are provided for isolating each of the primaries from the others, such as isolating diodes at each end of each primary.

Each secondary winding (secondary) of the matrix transformers is effectively coupled to both ends of a "digit line" in the memory matrix. When a current of a particular polarity is applied through a specific primary from its center tap, a voltage is induced upon the corresponding secondary, and a digit current of corresponding polarity is caused to flow through the associated digit line. If a "word line" pulse is also present at a bit location on the digit line, the digit current will cause the appropriate binary digit to be written into that location.

Selection of the particular primary to be energized, together with the current of proper polarity, is accomplished in the following manner. Switching means are provided, coupled to the digit driver, including $m$ pairs of unipolar terminals. The matrix transformers have been arranged in $m$ groups of $n$ transformers each. Each of the primaries within each group is coupled between a one of the pairs of unipolar terminals. Further means are provided for alternatively energizing a selected one of $n$ distinct comcombination of a unique center-tap from each of the *m* groups of transformers, in a predetermined sequence. In response to an applied address signal and to an applied binary digit signal from the digit driver, a unique one of the terminals is selected and coupled to an energy "sink." A current is caused to flow through the terminal, between the center-tap of a particular primary and the sink.

The read means include a plurality of input elements, one for each of the *m* pairs of terminals. Each of these input elements is coupled between a different one pair of unipolar terminals. A single output element is common to each of the input terminals, and is coupled to a single read amplifier.

The read means also include means for electrically isolating each pair of terminals from the one of the input elements corresponding thereto, and for selecting and electrically connecting one of the pairs of terminals to the input element corresponding thereto in response to an applied read command signal and to applied address signals.

For example, in a preferred embodiment of the invention, the read means include a transformer in which each of the input elements is a primary winding coupled to the associated terminals through isolating diodes, while the output element is a single secondary winding common to each of the read primaries and connected to the read amplifier. Each of the read primaries is supplied with a center-tap, which has normally impressed thereon a voltage sufficient to back bias the diodes, blocking any signal to the read amplifier.

When it is desired to perform a read operation, one of the *m* center-taps of the read primaries is selected by the concurrence of an applied read command signal and an applied address signal. A switch at the selected center-tap is closed to a voltage sink. A voltage applied to a selected matrix transformer center-tap causes a current of sufficient amplitude to forward bias the isolation diodes to flow through the selected pair of terminals and through the selected read primary, toward the sink, placing the diodes in a low impedance conducting region. This current, being substantially equal and opposite in polarity in each half of the read primary is undetected in the read secondary. Subsequent energization of a word line induces a voltage in the digit line, the polarity of which represents the binary digit stored by the magnetic element at the addressed location. This voltage appears on the selected read primary, since the selected matrix primary has been electrically connected to the selected read primary. This signal is coupled into the single read secondary which drives the read amplifier.

PRESCRIPTION OF THE DRAWINGS

In the drawings which illustrate a preferred embodiment of the invention:

Figure 1:
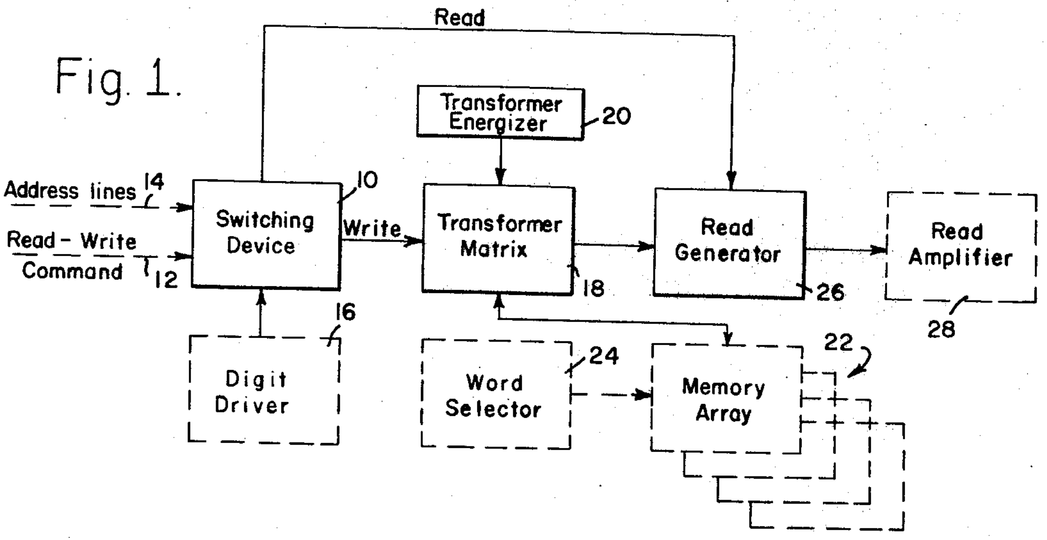
FIGURE 1 is a block diagram of a selection system in accordance with the present invention.

Turning to FIGURE 1, there is shown a switching device 10. In response to the concurrent application of a "write" command signal from a read-write command line 12, an address signal from address lines 14, and a signal from a digit driver 16 representing a binary "1" or "0," a selected transformer in a transformer matrix 18 is energized by a common transformer energizer.

The energized transformer "selects" a particular digit line in a word organized memory array 22, and a current flows through the selected digit line. The appropriate binary digit will be stored in the address location determined by the "intersection" of the selected digit line and a word line energized by the word selection circuits 24.

In response to a "read" command signal and address information into the switching device 10, the transformer energizer 20 enables a selected matrix transformer in the matrix 18, and a read generator 26. An appropriately addressed signal on a word line pulses a memory element on the selected digit line at the addressed location, inducing a current through the digit line into the transformer matrix 18. The transformer matrix 18 in turn applies a signal, the polarity of which corresponds to the bit stored in the addressed location of the memory array 22, to the read generator 26. This signal is then transmitted to a read amplifier 28.

Figures 2, 4:
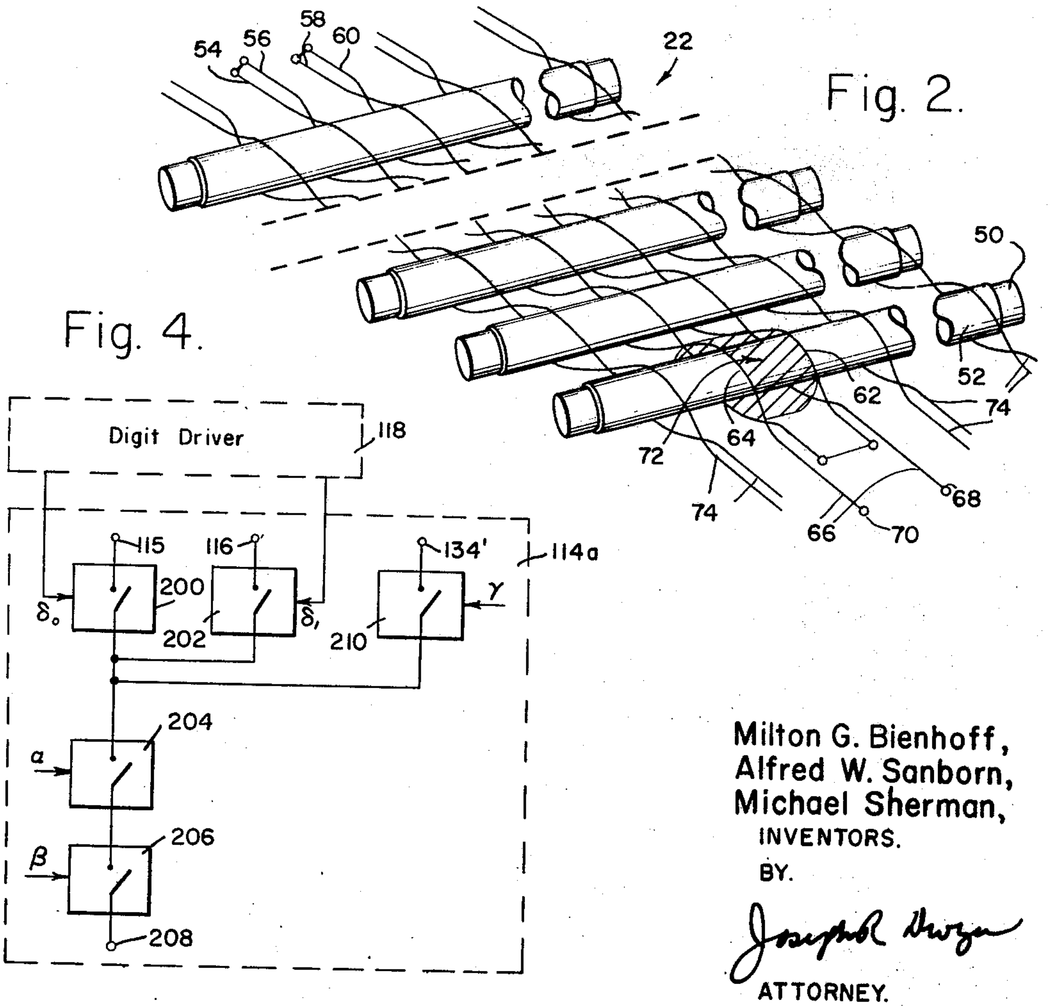
FIGURE 2 is a perspective diagram illustrating a typical plated woven wire memory matrix.
FIGURE 4 is a simplified circuit diagram of switching device for interconnecting the digit driver, the transformer matrix and the read generator illustrated in FIGURE 1.

A configuration of the memory array 22 is shown in FIGURE 2. A plurality of plated wires are interconnected along their circumferences by means of induction "coils" formed by weaving the plated wires with a plurality of insulated wires as the warp. For example, a first digit line 50, with a circumferentially oriented anisotropic magnetic thin film 52 plated thereon, is interconnected along its circumference to other diigt lines by woven insulated wires 54, 56, 58, 60. One of the ends of each insulated wire may be connected to a corresponding end of an adjacent insulated wire, so that a "coil" is formed about each digit line. Other coil configurations are possible, such as the configuration shown in FIGURE 2 where the insulated wires 54, 56, 58, 60 are interconnected in such manner as to form a pair of induction coils about each of the different digit lines, such as a first pair of coils 62, 64 about the first digit line 50. The interconnected insulated wires 54, 56, 58, 60 describe a first word line 66 across unconnected wire ends 68 and 70.

A first memory element 72 is located at the intersection of the first word line 66 and the first digit line 50. Similarly, other memory elements are located at other intersections of word lines and digit lines. For example, in a plated wire memory array which includes 80 digit lines and 256 word lines, each digit line is intersected by 256 inductive word coils; in such a case 256 words may be made available, each containing 80 bits.

Spacer wires 74 may be provided for memory element isolation to reduce the possibility of "cross talk" between adjacent memory elements.

Figure 3:
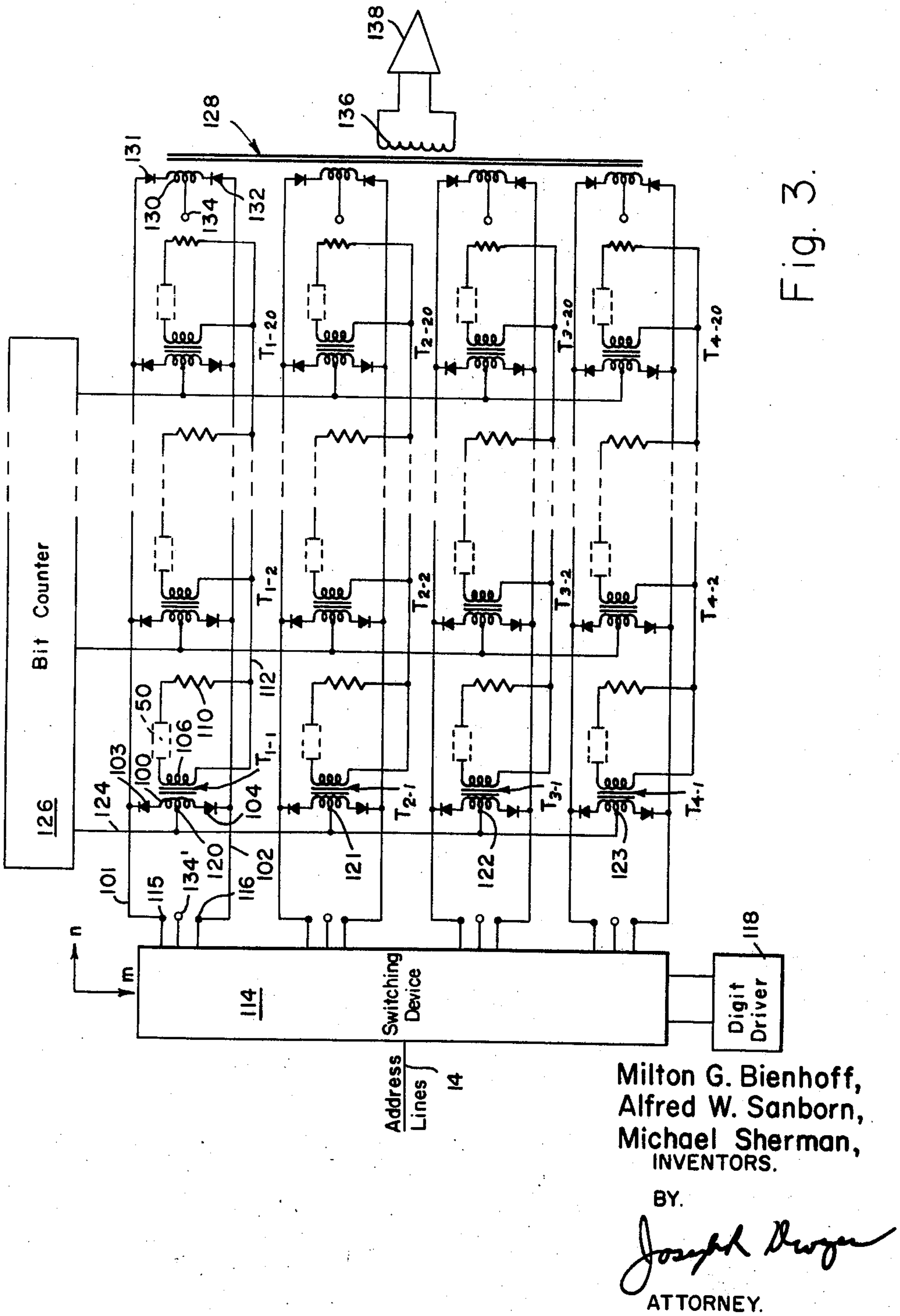
FIGURE 3 is a diagram, partly block and partly circuit, of a digit line selection matrix according to the present invention, in combination with a single digit driver and single read amplifier.

In FIGURE 3 there is shown a preferred embodiment of the present invention. The matrix transformers are arranged in four groups ($m=4$) of twenty each ($n=20$). Each matrix transformer is identified in accordance with a duality of subscripts ($T_{mn}$), the first of which pertains to its position along the vertical or *m* direction of the diagram, and the second subscription pertaining to its position in the horizontal or *n* direction.

Each group of transformers has each of its primaries interconnected in parallel; for example, a first transformer $T_{1-1}$ is connected between a first pair of *m* busses 101, 102, and each of the other transformers in the first group has its corresponding primary connected to the first pair of busses 101, 102, as well.

Diodes are connected into the circuit for matrix isolation, such as a first pair of diodes 103, 104 positioned between the ends of the primary 100 and the connection with the first busses 101, 102, respectively.

Each of the matrix transformers has a secondary winding coupled to a unique digit line of the memory array 22 of FIGURE 2. For example, the first transformer $T_{1-1}$ includes a secondary 106, one end of which is connected to the first digit line 50 of the memory array, which, in turn, is connected to a load resistor 110. Similarly, each one of the other secondaries of the matrix transformers is uniquely connected to a corresponding digit line of the memory array 22 which, in turn, is connected to a load resistor.

The individual digit lines are connected to the corresponding transformer secondaries, through four return lines, one for each group of transformers. For example, a return line 112 couples all of the digit lines associated with the first group of transformers, $T_{1-1}$ to $T_{1-20}$, inclusive, in common to the other ends of the secondaries in that group.

Each pair of *m* busses is connected to a different pair of terminals of a switching device 114; for example, the first *m* bus 101 is connected to a first terminal 115, and the second *m* bus 102 is connected to a second terminal 116. The switching device 114 includes four ($m=4$) pairs of such terminals, one for each group of transformers.

The switching device 114 is coupled to a digit driver 118, such that one of each pair of terminals, for example, the first terminal 115, is responsive to a first binary valued digit signal from the digit driver 118, while the other terminal of each pair, for example, the second terminal 116, is responsive to a second different binary valued digit signal from the digit driver 118.

The primary winding of each of the matrix transformers is provided with a center-tap; for example, the primary 100 of transformer $T_{1-1}$ includes a center-tap 120. Twenty ($n=20$) distinct combinations connect the center-taps from each of the four groups of transformers. For example, a first center-tap 120, a second center-tap 121, a third center-tap 122, and a fourth center-tap 123, are all connected to a first *n* bus 124.

Other similar combinations of transformer center-taps are connected to an appropriate one of the other *n* busses. The several *n* busses are connected to a circuit for alternatively energizing each of the twenty groups of center-taps in a predetermined sequence, and, in the preferred embodiment, a bit counter 126 is utilized.

In the preferred embodiment, a transformer 128 is used as a read-out device. The read-out transformer 128 includes four primaries ($m=4$), one connected to each pair of *m* busses. Means are provided for electrically isolating the busses from the windings. For example, the transformer 128 includes a first primary 130 connected between the first pair of *m* busses 101, 102, through a first pair of diodes 131, 132, which are poled oppositely to the matrix transformer primary diodes 103, 104. A center-tap 134 is provided on the first read-out primary 130, which center tap 134 is connected to a third terminal 134' of the switching device 114.

The read-out transformer 128 has a single secondary winding 136 which is inductively coupled in common to each of the primaries of the read transformer 128. The secondary winding 136 is connected to a single read amplifier 138.

OPERATION

The operating sequence for a "write" operation may be exemplified by the following description in which a binary digit is written into the first memory element 72 of the memory array 22, shown in FIGURE 2. Each of the center-taps (e.g., the first center-tap 134) of the primaries of the read transformer 128, has impressed thereon a first voltage signal sufficient to back bias the coupling diodes (e.g., the first pair of diodes 131, 132), thereby blocking any signal to the first secondary 136 of the read amplifier 138.

The bit counter 126 applies a second voltage signal to a selected *n* bus, for example, the first *n* bus 124. In response to an address signal applied to the switching device 114, one of the four pairs of terminals is selected, here the pairs 115, 116. One of the terminals of the selected pair is then further selected by the digit driver 118. In one embodiment, the first terminal 115 is enabled if the signal to be stored is a "0," while the second terminal 116 is enabled if the signal to be stored is a "1."

Assuming that the first terminal 115 is enabled, a current flows from the center-tap 120 through the upper half of the primary 100, through the first bus 101, and into the first terminal 115, to a "sink" in the switching device 114. A current is induced in the secondary 106 in the "0" representing direction, since, as can be seen, the direction of the current flowing through the primary 100 is dependent upon whether the input data was a "1" or a "0." At the secondary 106, a current pulse is driven in the apppropriate direction through the digit line 50 and the load resistor 110. If a word current pulse has been applied to the word line 66 (see FIGURE 2), the sufficient coercive force exists in the memory element 72 by the coincidence of the word current pulse and the digit current pulse to store the appropriate binary digit, here a "0."

When it is desired to read out a particular bit location, for example, the "0" now stored in element 72, the center-tap 134 of the read out transformer primary 130 is selected by the switching device 114 in response to a "read" command signal and the appropriate address signal. This connects the center tap 134 to an appropriate voltage "sink" in the switching device 114, which removes the disabling voltage heretofore impressed upon the center-tap 134. A second voltage signal is impressed upon the selected matrix transformer, here the center-tap 120 of transformer $T_{1-1}$, by the bit counter 126. Current now flows from the center-tap 120, through both halves of the matrix transformer primary winding 100, through the first pair of *n* busses 101, 102 equally, but oppositely through each half of the read out primary 130, and toward the voltage sink. The current is limited by a resistor in the switching device 114, and places the diodes 131, 132 in a low impedance conducting region. The first digit line 50 is therefore inductively coupled to the read amplifier 138, but since the currents in each half of the read primary 130 are equal and opposite, no signal is produced in read secondary 136.

A word current pulse now is provided through the word line 66 (see FIGURE 2) in response to an address signal and a read-command signal, inducing a voltage in the first memory element 72. This in turn induces a current in the first digit line 50, the polarity of which is dependent upon the value of the bit stored in the first memory element 72. A corresponding voltage is induced in the matrix transformer $T_{1-1}$. Since the matrix primary 120 and the readout primary 130 are now coupled through conducting diodes, a corresponding voltage signal of appropriate polarity appears on the primary 130, inducing a corresponding readout signal in the secondary 136, which drives the read amplifier 138.

In one example, the first voltage was +15 v. (applied to the center-taps of the primaries of the read transformer 128), the second voltage was +5 v. (from the bit counter 126), and the voltage "sink" in the switching device 114 was −3 v.

Turning now to FIGURE 4, there is shown one embodiment of a portion 114*a* of the switching device 114 of FIGURE 3, showing an interconnection of switches which may be associated with one group of *n* matrix transformers, such as the transformers $T_{1-1}$ to $T_{1-20}$, inclusive, and with the readout primary 130.

The digit driver 118 is shown in combination with the portion of the switching device 114*a*, and is connected to a pair of digit switches 200, 202. A first digit switch 200 is controlled by a first digit signal $\delta_0$ from the digit driver 118, representing a "0" valued binary digit. A second digit switch 202 is controlled by a second digit signal $\delta_1$ from the digit driver 118, representing a "1" valued binary digit.

One side of the first digit switch 200 is connected to the first terminal 115, which in turn is connected to the first *m* bus 101, as shown in FIGURE 3, while a corresponding side of the second digit switch 202 is connected to the second terminal 116. The other side of each of the digit switches 200, 202, is connected in common to one side of an address switch 204 which is controlled by an address signal $\alpha$. The other side of the address switch 204 is connected to one side of a "read-write" switch 206 which is controlled by a "read-write" command signal $\beta$. A voltage "sink" 208 is provided, which is connected to the other side of the read-write switch 206.

A "read" switch 210 is provided, controlled by a "read" command signal $\gamma$. One side of the "read" switch 210 is connected to the third terminal 134', which is connected to the first readout primary center tap 134, as shown in FIGURE 3. The other side of the "read" switch 210 is coupled to the voltage sink 208 through the address switch 204 and the "read-write" switch 206.

All switches are normally open. During a "read" or "write" operation, a "read-write" command signal $\beta$ will cause the "read-write" switch 206 to close, and an appropriate address signal $\alpha$ will cause the address switch 204 to close.

During a "write" operation, the digit driver 118 will provide either a first digit signal $\delta$ to the first digit switch 200, or a second digit signal $\delta$ to the second digit switch 202, according to the value of the binary digit to be stored. For example, if a "0" valued binary digit is to be written, the digit driver 118 will provide a first digit signal $\delta_0$ at the first digit switch 200, causing the switch to close. An electrical path will therefore be provided from the first terminal 115 to the voltage sink 208, enabling the first $m$ bus 101 of FIGURE 3.

During a "read" operation, the "read" command signal $\gamma$ causes the "read" switch 210 to close. The digit switches 200, 202 are open, while the address switch 204 and the "read-write" switch 206 are closed in response to an appropriate address signal $\alpha$ and a "read-write" signal $\beta$, respectively. An electrical path is presented, therefore, between the third terminal 134' and the voltage sink 208. Since the third terminal 134' is connected to the center-tap 134 of the read-out transformer primary 130, shown in FIGURE 3, diode forward current is pulled through the center-tap 134, thereby connecting the read amplifier 138 to the first pair of $m$ busses 101, 102.

It should be noted that each of the switches 200, 202, 204, 206, 210 are diagrammatically shown in FIGURE 4, and they may be effected by various means. For example, the switching functions may be provided by transistors, or other solid state switching devices, together with circuits appropriate thereto, or other types of electronic switches. Relays may alternatively be provided, where circumstances permit.

Thus, there has been shown a preferred embodiment of a digit line selection matrix for use with a computer memory. Other embodiments of the present invention and modifications of the embodiment herein presented may be developed without departing from the essential characteristics thereof.

Accordingly, the invention should be limited only by the scope of the claims listed below.

What is claimed is:

1. In a memory unit, a matrix circuit for commutating a read amplifier and a digit driver among a plurality of plated thin film magnetic storage elements of a memory array, said circuit comprising the combination of:
   - switch means including $m$ pairs of terminals, $m$ third terminals and an energy sink, said switch means being adapted to receive address signals indicative of one of said pairs for selecting one terminal of said pair and for coupling said selected terminal to said energy sink for writing in response to an address signal and to a binary digit signal from the digit driver;
   - a plurality of transformers arranged in $m$ groups of $n$ transformers each, each of said transformers including a primary winding having a center-tap and a secondary winding, each of said $m$ groups having each of said primaries associated therewith coupled through electrical isolating means between a different one of said pairs of terminals, and each of said secondaries of said transformers coupled in series to a different plated wire of the memory array;
   - means connected to each of said center-taps for alternatively energizing a selected group of $m$ secondaries one from each group of $n$ transformers, in a predetermined sequence; and
   - read means for generating a read signal representing a particular binary digit stored in one of the plated storage elements in the memory array and for transmitting said read signal to the read amplifier, said read means comprising: a plurality of input means, each adapted to be coupled between a different one of said pairs of terminals, further including means coupled to the third terminal of said switch means and to said input means for selecting and coupling one of said pairs to one of said input means; and output means coupled to each of said input means and further coupled to the read amplifier.

2. The memory unit, as claimed in claim 1, wherein said thin film magnetic storage elements comprise plated wires.

3. A memory unit, as in claim 1, wherein said read means comprises a read transformer having a plurality of read primary windings and a read secondary winding, and wherein each of said input means is a different one of said read primaries, and said output means is said read secondary.

4. A memory unit, as in claim 1, wherein said plurality of input means includes a plurality of read primary windings each having a center-tap, said output means includes a secondary winding, and said means for selecting and coupling one of said pairs of terminals to one of said read primaries includes a plurality of normally non-conducting diode pairs, each of said diode pairs connected between a different one of said read primaries and said pair of terminals associated therewith and further including means connected to each of said read primary center-taps for placing a selected one of said pairs of diodes into an electrically conductive condition.

5. A memory unit, as in claim 4, wherein said read diodes are normally back biased by energization impressed upon each of said read primary center-taps, and said electrically conductive condition is obtained by means for connecting a selected one of said read primary center-taps to an energy sink.

6. A memory unit, as in claim 1, wherein said means for electrically isolating said primaries each from the other includes a plurality of isolating matrix diode pairs, each of said diode pairs connected between a different one of said primaries and said terminals associated therewith.

7. A memory unit, as in claim 1, wherein said means for alternatively energizing said selective group of $m$ secondaries is a bit counter.

References Cited

UNITED STATES PATENTS

| | | | |
|---|---|---|---|
| 2,981,931 | 4/1961 | Tate | 340—172.5 |
| 3,157,860 | 11/1964 | Batley | 340—174 |
| 3,371,326 | 2/1968 | Fedde | 340—174 |
| 3,172,087 | 3/1965 | Durgin | 340—174 |
| 3,231,876 | 1/1966 | Vinal | 340—174 |

BERNARD KONICK, Primary Examiner

K. E. KROSIN, Assistant Examiner